United States Patent
Kranz

[15] 3,702,079
[45] Nov. 7, 1972

[54] APPARATUS FOR THE FORMATION OF OUTPUT SIGNALS FROM GYROSCOPES

[72] Inventor: Walter Kranz, Munich, Germany

[73] Assignee: Messerschmitt-Bolkow-Blohm Gesellschaft mit beschrankter Haftung, Ottobrunn near Munich, Germany

[22] Filed: Sept. 16, 1970

[21] Appl. No.: 72,639

[30] Foreign Application Priority Data

Oct. 10, 1969   Germany..........P 19 51 087.3

[52] U.S. Cl. ....................................74/5.6, 244/79
[51] Int. Cl. ..............................................G01c 19/28
[58] Field of Search ..........137/81.5; 74/5, 5.43, 5.6; 244/79; 33/226 A

[56] References Cited

UNITED STATES PATENTS

| | | |
|---|---|---|
| 3,492,879 | 2/1970 | Riordan et al. .........74/5.43 X |
| 2,315,167 | 3/1943 | Von Manteuffel et al. ...........................74/5.6 X |
| 3,311,987 | 4/1967 | Blazek .....................74/5.6 X |
| 2,584,125 | 2/1952 | Haglund .......................74/5.6 |
| 3,465,600 | 9/1969 | Riordan et al. .........74/5.43 X |
| 3,340,740 | 9/1967 | Hall .............................74/5.6 |

*Primary Examiner*—Manuel A. Antonakas
*Attorney*—McGlew and Toren

[57] ABSTRACT

A gyroscope is supported in three gimbals pivotal about mutually perpendicular axes which are perpendicular to an axis of rotation of the gyroscope rotor. The gyroscope rotor is rotatably mounted in a rotor frame constituting the inner gimbal, and the outer gimbal is secured to the fuselage of an airborne vehicle. A planar diaphragm is secured to the rotor frame. Four jet nozzles discharge fluid streams into respective collector nozzles axially aligned therewith, the four jet nozzles being arranged at the corners of a square which is standing on one corner. The planar diaphragm normally interrupts the flow of air from the jet nozzles to the collector nozzles. Each pair of collector nozzles is connected to respective control inputs of a flow amplifier which inputs are also connected to the output channels of a flow oscillator providing sawtooth output pulses. The amplifier provides pulse-width modulated output signals corresponding to deflections of the fuselage about a pitch axis, a yaw axis, or both.

9 Claims, 6 Drawing Figures

INVENTOR

Walter Kranz
by *McGlew and Toren*
ATTORNEYS

INVENTOR

Walter Kranz
by McGlew and Toren
ATTORNEYS

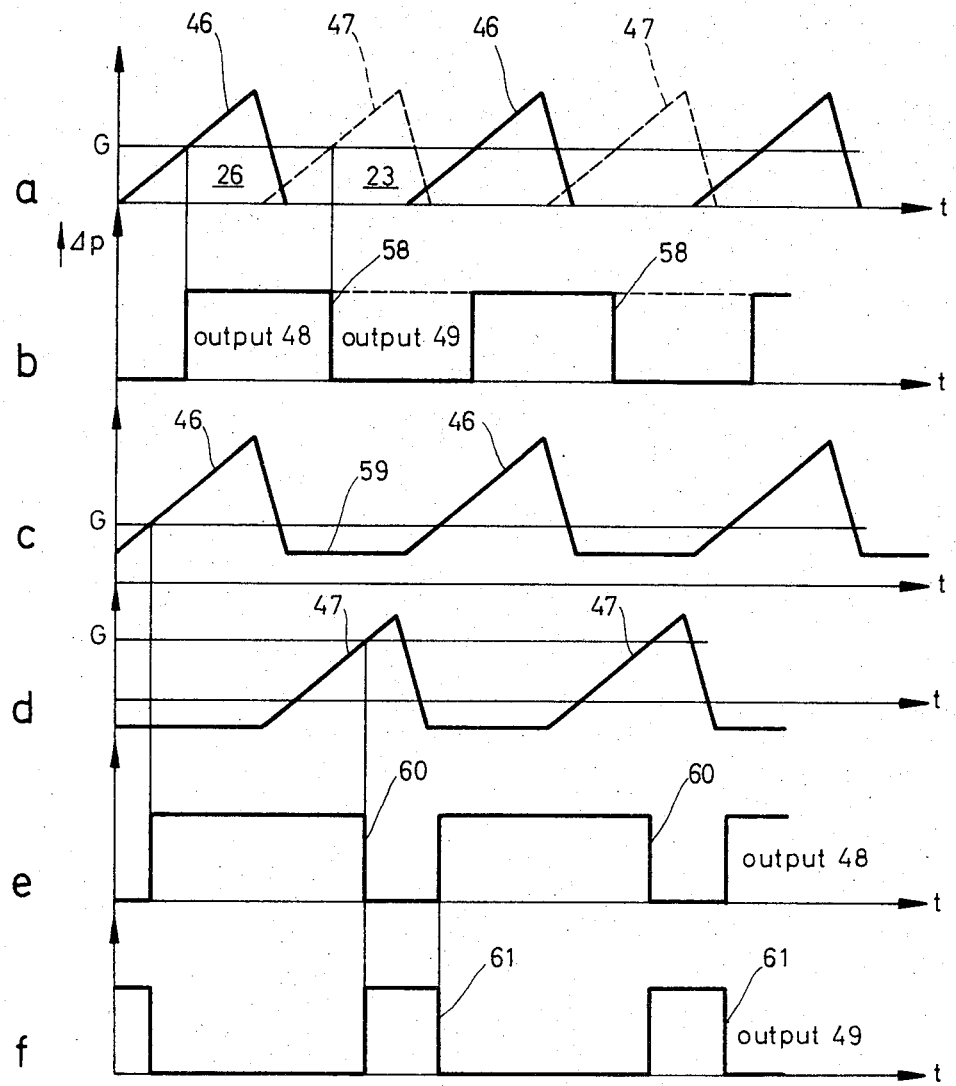

APPARATUS FOR THE FORMATION OF OUTPUT SIGNALS FROM GYROSCOPES

BACKGROUND OF THE INVENTION

Known apparatus or arrangements for forming output signals from a gyroscope utilize preferably electromechanical means in such a manner that the mechanical motion of the gyroscope casings are converted into electrical quantities, for instance by means of potentiometers. The mechanical connections between the gyroscope casings and the potentionmeter slip rings, required for transmission of the output signals, result, due to the friction forces present, in drift and precession of the rotor axes of the gyroscopes. The gyroscopes thereby lose their orientation which was originally fixed in space so that, after a certain time, the results of the measurement become useless.

In order to keep the friction forces at a small magnitude, only a low contact pressure between the sliding contacts frequently is chosen. This, however, has the disadvantage that the electrical contact becomes inadequate, as the pressure between the sliding contacts is not sufficient to remove contamination of the contact surfaces, such as caused by dust or oxidation.

Another possibility of forming output signals from gyroscopes is to use electronic devices. However, in these arrangements variable inductances or capacitances are used as transducers for the measured quantity, but the expense for the electronic measuring apparatus is, in general, very high.

Photoelectric arrangements, which also have been used for forming output signals from gyroscopes, require a high degree of technical expenditure in spite of their low efficiency. In addition, the reflecting surfaces of the optical lenses or mirrors of these arrangements are very sensitive to dust and oxidation, for example if the gyroscope is stored for extensive periods. Additionally, the filaments of the light sources are not acceleration-resistant.

SUMMARY OF THE INVENTION

This invention relates to the formation of output signals from gyroscopes and, more particularly, to a novel and improved arrangement for such formation involving only fluid flow elements.

The objective of the invention is to provide a new apparatus or means for the formation of output signals from gyroscopes, particularly for determining only small deviations from a reference position and which apparatus operates without any mechanical connection between the gyroscope and the indicating instrument.

Starting from known means of fluid flow technology, this problem is solved by a planar diaphragm which is secured to the rotor frame of the gyroscope to extend perpendicularly to the rotor axis. This diaphragm is arranged between jet and collector nozzles, in which a flow issuing from a jet nozzle, so long as it is not interrupted by the diaphragm, can be collected by a collector nozzle. The arrangement further includes a flow oscillator having output pulses which are sawtooth-shaped, and also includes a preferably bistable flow amplifier. The two control inputs of the amplifier have connected thereto channels communicating with the collector nozzles, together with the output channels of the flow oscillator, so that output signal can be derived as a pulse-width modulated output signal.

In an application of the invention, formation of the output signals is obtained in a gimbal supported gyroscope having three gimbal rings, the axes of which are mutually perpendicular to each other. The diaphragm is attached to the rotor frame, constituting the inner gimbal, and the outer or third frame, as well as the jet and collector nozzles, the flow oscillator and the flow amplifier, are preferably connected to the fuselage of an aerodynamic body.

An important advantage of the invention apparatus is that it has no electrical parts used to form the gyroscope output signals. Thus, when used, in a preferred form of application, in the steering and control loop of an aerodynamic body, it is insensitive to directed electromagnetic interferences transmitted by an enemy. Likewise, the radioactive radiation that might be present in a battle area cannot falsify the formation of the output signals of the gyroscope, which is an advantage not attainable with the above-mentioned known arrangements.

Possible mechanical restoring forces which act upon the diaphragm due to the flow impact can be reduced by suitable design of the diaphragm, or by throttling down the intensity of the flow leaving the jet nozzles.

In order reliably to avoid that a portion of the current flowing past the diaphragm does not reach the collector nozzles, for instance because the flow is deflected from its direction by the diaphragm, which is equivalent to a baffle as to its function, or because it is disturbed by the diaphragm in such a manner that it becomes turbulent and is scattered, the collector nozzles have, according to a preferred embodiment of the invention, a funnel-shaped design at the inlet openings facing the respective jet nozzles.

In general, the input characteristics of a bistable flow amplifier is not linear. Also, due to tolerances in manufacturing the jet and collector nozzles, the intensity of the flow pressure present at the collector nozzles is not proportional to the quantity to be measured, i.e. to the position of the rotor frame relative to the housing of the gyro. For this reason, there is provided, in accordance with one embodiment of the invention, that the edge of the diaphragm against which the jet nozzles blow, has indentations and cutouts in such a manner that the output signal of the bistable flow amplifier, multiplied as to its pulse duration or width, is proportional to the quantity to be measured.

Admittedly, it would be conceivable to effect the proportionality between the measurement value and the pulse-width modulated output signal of the bistable flow amplifier by shaping or machining the jet nozzles in an appropriate manner. However, the exact shaping of the jet nozzles is substantially more difficult to effect than the mechanical shaping of the diaphragm. If the jet nozzles are, for example, made of glass, a later correction of the nozzle orifices is hardly possible.

Machining the diaphragm has the additional advantage that the measuring accuracy of the arrangement can be increased, or can be made particularly large in only one specific range of the quantity to be measured. Thereby, for instance, a quadratic relation exists between the value to be measured and the output signal of the amplifier.

An object of the invention is to provide improved apparatus for forming output signals from a gyroscope.

Another object of the invention is to provide such apparatus which does not include any electrical or electronic parts.

A further object of the invention is to provide such an apparatus which operates entirely on fluid flow principles.

Another object of the invention is to provide such an apparatus which forms pulse-width modulated output signals corresponding to the quantity to be measured.

A further object of the invention is to provide such an apparatus which is inexpensive to manufacture and reliable in operation.

Another object of the invention is to provide such an apparatus which is insensitive to electromagnetic influences as well as insensitive to radioactive influences.

For an understanding of the principles of the invention, reference is made to the following description of typical embodiments thereof as illustrated in the accompanying drawing.

BRIEF DESCRIPTION OF THE DRAWING

In the drawing:

FIG. 3 is a graphic representation of the pulse width modulation;

DESCRIPTION OF THE PREFERRED EMBODIMENTS

Figure 1:
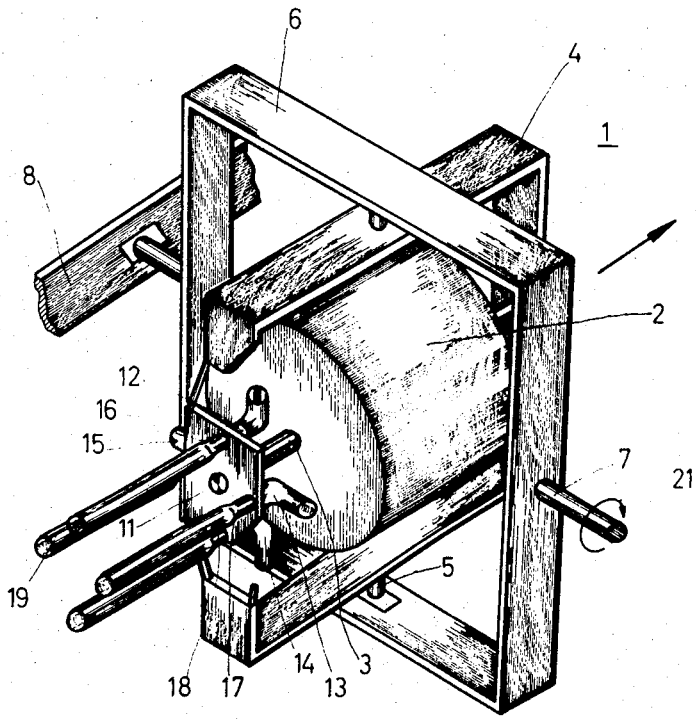
FIG. 1 is a perspective view of a gimbal supported gyroscope with a gyroscope pickup embodying the invention.

Referring to FIG. 1, the gimbal-supported gyroscope 1 comprises a rotor 2 whose axle or axis of rotation 3 is rotatably supported in an inner gimbal or rotor frame 4. The pivotal axis of rotor frame 4 is perpendicular to rotor axis 3, and is supported in an intermediate gimbal or frame 6. The axis 7 of frame 6 is perpendicular to rotor axis 3 as well as to axis 5 of rotor frame 4. Through the medium of axis 7, frame 6 is supported in a third frame 8, not shown in detail, which is connected with the fuselage of an aerodynamic body.

Figure 4:
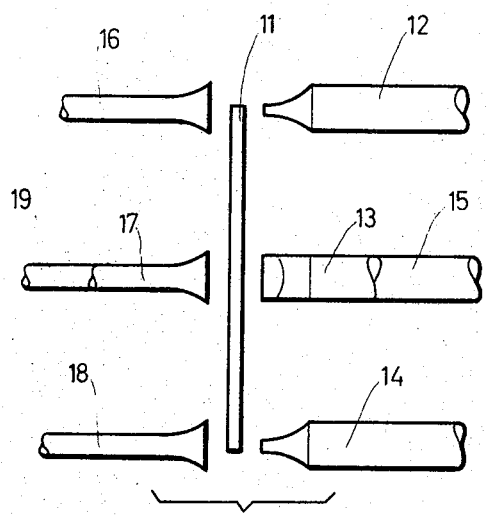
FIG. 4 is a partial side elevation view of FIG. 1 illustrating collector nozzles having funnel-shaped inlets.

On rotor frame 4, there is arranged, perpendicularly to rotor axis 3, a planar diaphragm 11 positioned adjacent four jet nozzles 12, 13, 14 and 15 which are arranged in fixed relation to the aerodynamic body and which are displaced by 90° angularly relative to each other. Opposite nozzles 12 – 15, there are arranged collector nozzles 16, 17, 18, and 19 which are coaxial with the respective jet nozzles 12, 13, 14 and 15. Collector nozzles 16 – 19 preferably have a funnel-shaped design, as best seen in FIG. 4. A flow medium discharge from jet nozzles 12 – 15, and which preferably is air, is interrupted by diaphragm 11 if all three gyroscope frames are perpendicular to each other, or in other words, if the aerodynamic body is flying in the direction of rotor axis 3 which latter is fixed in space.

If the aerodynamic body carries out, for instance, a rotary motion about axis 7, which corresponds to a pitching motion, the air stream from nozzle 12 will, if the motion takes place in the direction of the arrow 21 of FIG. 1, reach collector nozzle 16 either partially or fully depending on the intensity of the pitching motion. On the other hand, the air stream between nozzles 14 and 18 remains interrupted by diaphragm 11. In case of motion of the aerodynamic body about pitch axis 7 in a direction opposite to the direction of arrow 21, the air stream from nozzle 14 will reach collector nozzle 18 fully or partially, while the air stream between nozzles 12 and 16 remains interrupted by diaphragm 11. A corresponding situation applies to nozzles 13 and 17, and 15 and 19, respectively, for motions of the aerodynamic body about the yaw axis 5.

Figure 2:
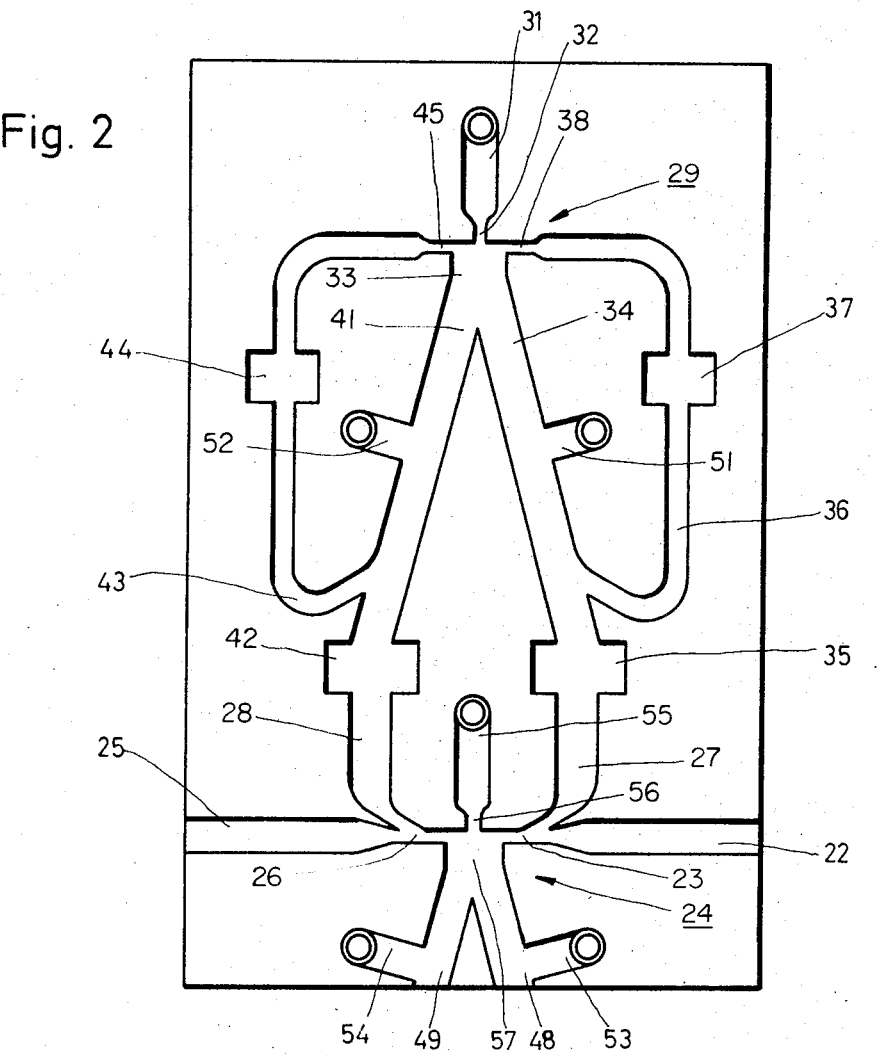
FIG. 2 is a circuit composed of flow elements for the pulse width modulation.

In the following, the formation of an output signal for pitching motions of the aerodynamic body will be described. Referring to FIG. 2, collector nozzle 16 is connected with one of the control inputs 23 of a bistable flow amplifier 24 through line 22, and nozzle 18 is connected with the other input 26 through line 25. Output lines 27 and 28 of a flow oscillator 29 are also connected to amplifier inputs 23 and 26, respectively. In principle, any flow oscillator can be used for forming the indication as long as its output signal has a sawtooth shape. Only an oscillator of this type will be described.

If the main flow of oscillator 29, which enters through the line 31 and the channel 32 into chamber 33, goes, for instance, into channel 34, one part will flow through a capacitance 35 into output channel 27. Another part will flow through the feedback channel 36 and through a capacitance 37 to the control input 38 of oscillator 29. In chamber 33, the feedback flow influences the main flow of oscillator 29 in such a manner that it is deflected into channel 41. Thereupon, a part of the main flow will again pass, through a capacitance 42, into output channel 28. Another part will flow through channel 43 and capacitance 44 back to control input 45 of oscillator 29 and deflect the main flow back into channel 34. The pulse duration of the oscillator is determined by the dimensions of the feedback channels 36 and 43 and of the capacitances 37 and 44, respectively. The pulses 46 and 47, which appear respectively in output channels 27 and 28, have a sawtooth-like shape, as best seen in FIG. 3a, due to the capacitances 35 and 42 and the vent apertures 51 and 52.

Channels 34 and 41, as well as output channels 48 and 49 of amplifier 24, are provided, in a manner known per se, with the vents 51 and 52, respectively, and 53 and 54, respectively, in order to prevent, in addition to influencing the wave-shape of pulse 46 and 47, an overpressure or back up in the oscillator resulting in unintended flipping over of the main flow currents.

If the main flow of bistable flow amplifier 24, which passes through line 55 and channel 56 into chamber 57, is influenced only by output pulses 46 and 47 of oscillator 29, the main flow of bistable amplifier 24 always flips over when output pulses 46 or 47, respectively have a given intensity represented by the threshold G in FIGS. 3a and 3b. In the outputs 48 and 49 of amplifier 24, there appear square wave signals 58 of equal magnitude.

If, however, in addition to the oscillator pulses, for instance, pulse 47, there appears a continuous signal 59, as shown in FIG. 3c, through the line 25 and due, for example, to a pitch motion of an aerodynamic body, the total control signal at point 26 of amplifier 24 will reach the threshold G sooner than was the case with oscillator pulse 47 alone. The main flow of amplifier 24 therefore flips over into the output channel 48 sooner.

As only the oscillator signal 46 is present at point 23 of amplifier 24, the main flow of the amplifier flips over again to output channel 49 only when signal 46, which counteracts the control signal applied through line 25, has reached the threshold G, as shown in FIG. 3d. Therefore, in the output channels of amplifier 24, signals 60 and 61 are generated, and the pulse duration of these signals is a known function of the position of inner or rotor frame 4 relative to the position of the aerodynamic body. Direct indication of the position therefore can be obtained on an indicator device, not described here in detail, after direction-dependent integration of the pulse widths.

Figure 5:
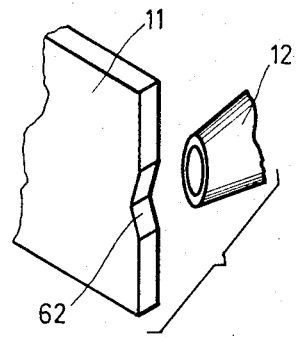
FIGS. 5 and 6 are partial perspective views illustrating different designs of the diaphragm.
Figure 6:
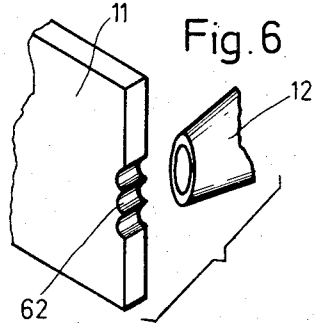

In a similar manner, the formation of an output signal for the motion of the aerodynamic body about the yaw axis 5 can be obtained. As the indication will, in general, not be proportional to the quantity to be measured, due to manufacturing tolerances or the non-linear input characteristic, diaphragm 11 is provided, for the purpose of linearization, with indentations or cutouts 62, or both, as shown in FIGS. 5 and 6. These are provided at the points where the diaphragm is impinged upon by the flow coming from jet nozzles 12 through 15. Thereby, it is possible furthermore to select the output signals 60 and 61, appearing at the bistable amplifier 24, as a defined function of the deviation of the aerodynamic body from the position of rotor axis 3 which is fixed in space, for instance, but between the quantity to be measured and the output signal there will exit either proportionality or a quadratic relation. Without variation from the concept of the invention, still other possibilities for the design of the nozzles or of the diaphragm are conceivable, other than those shown in FIGS. 5 and 6.

Similarly, one can start out to form the output signal with a pressure different from zero, for instance, with two equal input currents in the collector nozzles 16 and 18, and 17 and 19, respectively. This can be accomplished, for example, by reducing the diaphragm covering the associated jet nozzle.

As will be clear from the foregoing description, an arrangement or apparatus for the formation of an analog output signal, in accordance with the invention, makes possible, without a large design effort, the exact determination of small position deviations of the third gyroscope frame, or of an aerodynamic body rigidly connected therewith, relative to the space referenced position of the rotor axis. Thus, it is possible, for example, to implent the steering and aircraft control system of the aerodynamic body without the use of electrical components. This makes the aerodynamic body insensitive, for example, to electromagnetic interference by an enemy or to radioactive radiation that may be present in a battle area.

While specific embodiments of the invention have been shown and described in detail to illustrate the application of the principles of the invention, it will be understood that the invention may be embodied otherwise without departing from such principles.

What is claimed is:

1. Means for forming output signals from a gyroscope including a rotor rotatably mounted in a pivotal rotor frame, said means comprising, in combination, a planar diaphragm secured to said rotor frame and oriented perpendicular to the rotor axis; at least one pair of jet nozzles adjacent said diaphragm connected to a source of fluid under pressure and discharging streams of fluid; collector nozzles, each respective to, and axially aligned with, a different jet nozzle to receive the stream of fluid therefrom; said diaphragm normally being at least partially interposed between said jet and collector nozzles to modulate the flows of fluid into said collector nozzles; a flow oscillator providing saw-tooth output pulses in respective output channels; and a flow amplifier, for each pair of nozzles, having two control inputs connected by respective channels to the two collector nozzles of a pair, and connected to respective oscillator output channels; whereby, upon relative displacement of said diaphragm and said nozzles, said amplifier provides pulse-width modulated output signals corresponding to the quantity to be measured.

2. Means for forming output signals from a gyroscope, as claimed in claim 1, in which said flow amplifier is a bistable flow amplifier.

3. Means for forming output signals from a gyroscope, as claimed in claim 1, in which said gyroscope is a gimbal supported gyroscope with three gimbal frames having axes mutually perpendicular to each other, said rotor frame constituting the innermost gimbal frame; the outermost frame and said jet and collector nozzles being fixedly positioned relative to each other.

4. Means for forming output signals from a gyroscope, as claimed in claim 3, in which said outermost frame and said jet and collector nozzles are fixedly connected with the fuselage of an aerodynamic body.

5. Means for forming output signals from a gyroscope, as claimed in claim 4, in which said flow oscillator and each flow amplifier are connected with the fuselage of said aerodynamic body.

6. Means for forming output signals from a gyroscope, as claimed in claim 1, in which said collector nozzles have outwardly diverging funnel-shaped inlets.

7. Means for forming output signals from a gyroscope, as claimed in claim 1, in which each edge of said diaphragm against which said jet nozzles discharge streams of fluid is formed with cutouts effecting a preselected functional relation between such relative displacements and the corresponding output signals.

8. Means for forming output signals from a gyroscope, as claimed in claim 1, in which there are four jet nozzles disposed at equal radial distances from the axis of said gyroscope rotor and at 90° angular spacings to each other.

9. Means for forming output signals from a gyroscope including a rotor rotatably mounted in a pivotal rotor frame, said means comprising, in combination, a planar diaphragm secured to said rotor frame and oriented perpendicular to the rotor axis; at least one pair of jet nozzles adjacent said diaphragm connected to a source of fluid under pressure and discharging streams of fluid; collector nozzles, each respective to, and axially aligned with, a different jet nozzle to receive the stream of fluid therefrom; said diaphragm normally being at least partially interposed between said jet and collector nozzles to modulate the flows of fluid into said collector nozzles; a flow oscillator providing saw-tooth output pulses in respective output channels; and a flow amplifier, for each pair of nozzles, having two control inputs connected by respective channels to the two collector nozzles of a pair, and connected to respective oscillator output channels; whereby, upon relative displacement of said diaphragm and said nozzles, said amplifier provides pulse-width modulated output signals corresponding to the quantity to be measured; said gyroscope being a gimbal supported gyroscope with three gimbal frames, the axes of which are mutually perpendicular to each other, said rotor frame constituting the innermost gimbal frame; the outermost gimbal frame and said jet and collector nozzles being fixedly secured with the fuselage of an aerodynamic body.

* * * * *